Sept. 28, 1954  J. KURSHAN  2,690,534
REVERSIBLE POLARITY REGULATED
RADIO-FREQUENCY POWER SUPPLY
Filed Dec. 1, 1951
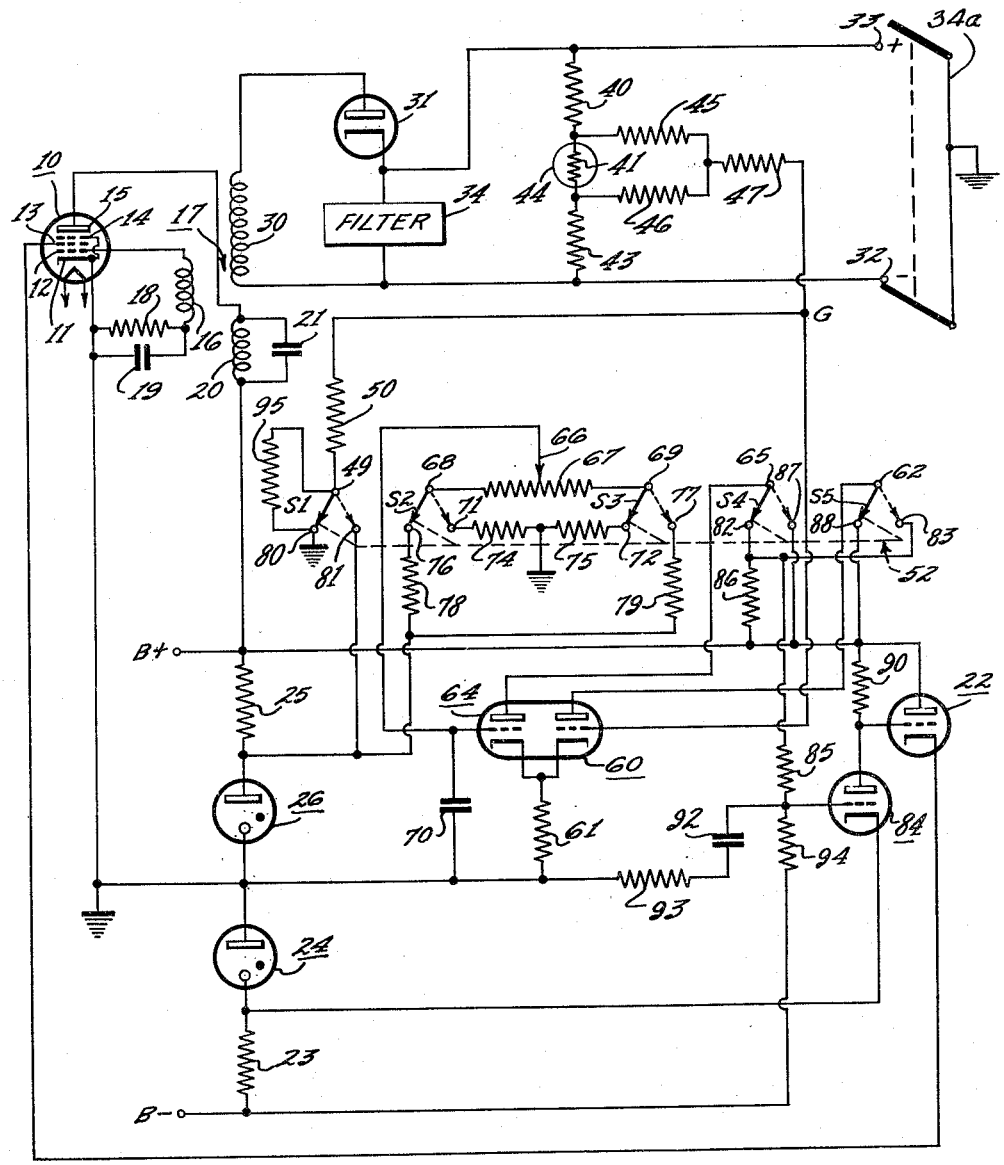
INVENTOR
Jerome Kurshan
BY
Morris L. Rabkin
ATTORNEY Patented Sept. 28, 1954

2,690,534

UNITED STATES PATENT OFFICE 2,690,534

REVERSIBLE POLARITY REGULATED RADIO-FREQUENCY POWER SUPPLY

Jerome Kurshan, Princeton, N. J., assignor to Radio Corporation of America, a corporation of Delaware Application December 1, 1951, Serial No. 259,456

The terminal 15 years of the term of the patent to be granted has been disclaimed 10 Claims. (Cl. 321—2)

This invention relates to improvements in regulated, radio-frequency, high voltage, power supplies, and more particularly to regulated, radio-frequency, high voltage, power supplies of reversible polarity.

The term "reversible polarity" as applied to power supplies in this specification, is used to describe a power supply adapted to produce either a positive voltage output or a negative voltage output by selectively grounding either the negative output terminal or the positive output terminal, respectively, of the power supply.

In the electronics laboratory, radio-frequency power supplies are often resorted to where unidirectional, high voltages of the order of many thousands of volts at moderate current requirements are desired. The regulation of such high voltage supplies is usually accomplished by controlling the amplitude of the radio-frequency oscillations at a comparatively low D.-C. voltage level. Power supplies utilizing such regulation, by controlling the voltage of one or more electrodes of an oscillator tube, are known in the art. Such regulated, radio-frequency power supplies, however, are practically always of a fixed voltage output polarity because of the desirability of having the regulating circuit operate at a relatively low D.-C. voltage level. Difficult problems in insulating the regulating circuit arise in power supply systems which raise the operating voltage level of the regulating circuit, with respect to ground, when the voltage output polarity is reversed.

Where it is necessary to build or test many different types of experimental electronic equipment, requiring the temporary use of a regulated, high voltage, radio-frequency, power supply, it is very desirable to use a power supply of reversible polarity; that is, a power supply capable of having either its positive or negative output terminal grounded without affecting its regulation. If the same regulated, radio-frequency, power supply could be used in different circuits because of its reversible polarity, its use, as a piece of laboratory equipment would be doubly extended and the additional expense resulting from the need for separate regulated power supplies of different fixed polarities would be obviated.

Unregulated, radio-frequency, power supplies having a voltage output of the order of ten kilovolts are capable of having their polarities reversed by merely grounding either the positive or the negative output terminal, since both of these terminals can be insulated easily for the full voltage. When the radio-frequency, power supply is regulated by controlling the amplitude of the radio-frequency oscillations of the oscillator tube, however, the regulating circuit must have some point connected to ground because the components thereof are usually insulated for only several hundred volts with respect to ground. If only the grounding of the high voltage output terminals is reversed, the circuit will cease to function properly because the high and low voltage circuits will no longer bear the same relationship to each other. On the other hand, if a common connection is maintained between the low voltage and high voltage circuits and the output polarity is then reversed, the insulation of the components in the low voltage regulating circuit will break down.

It is, accordingly, a principal object of the present invention to provide an improved, regulated, radio-frequency, high voltage, power supply of reversible polarity in which the regulating circuit need be insulated for relatively low voltage only.

It is a further object of the invention to provide an improved, regulated, radio-frequency, high voltage, power supply employing simple ganged switching means operable in a comparatively low voltage circuit for reversing the polarity of the power supply.

Another object of the invention is to provide an improved, regulated, radio-frequency, high voltage, power supply capable of having either one of its output terminals grounded without affecting the operation or the range of regulation of the power supply.

Still another object of the invention is to provide an improved, regulated, radio-frequency, high voltage, power supply employing a voltmeter and voltmeter multipliers as part of a symmetrical feedback bleeder.

According to the invention, these and other objects and advantages are attained in a regulated, radio-frequency, high voltage, power supply comprising a power circuit, a regulating circuit, and a switching circuit. A high frequency voltage from a radio-frequency oscillator is stepped-up and rectified by the power circuit to produce a unidirectional, high voltage output. A sample voltage, taken from a symmetrical bleeder across the output terminals of the high voltage output, is fed back to the regulating circuit for degeneratively controlling the amplitude of the radio-frequency oscillations. When it is desired to reverse the polarity of the power supply from a positive voltage output (negative output terminal grounded) to a negative voltage output (positive output terminal grounded), the switching circuit provides means for maintaining the correct polarity of the sample voltage fed back to the regulating circuit, means for shifting the phase of the feedback signal in a direct-current amplifier section of the regulating circuit by 180°, and means for changing an output voltage control circuit so that a movement of the output voltage control in one direction will increase the voltage output of the power supply regardless of the polarity of the power supply voltage output selected. All switching is accomplished by a ganged switching unit in a comparatively low D.-C. voltage circuit. The components of the regulating network operate at a relatively low D.-C. voltage level and need be insulated for several hundred volts only. A meter multiplier circuit forms part of the symmetrical bleeder.

The invention will be further described by reference to the accompanying drawing of which the single figure is a schematic circuit diagram of a preferred embodiment thereof.

Referring to the drawing, there is shown a reversible polarity, regulated, radio-frequency, high voltage power supply circuit in which a radio-frequency oscillator circuit comprises a pentode oscillator tube 10 having a grounded cathode 11, a control grid 12, a screen grid 13, a suppressor grid 14 connected to the cathode 11, and an anode 15. The control grid 12 of the tube 10 is connected to ground through a feedback winding 16 of a transformer 17 in series with a grid leak comprising a resistor 18 in parallel with a capacitor 19. The plate 15 of the tube 10 is connected to a source of B+ voltage supply through a resonant tank circuit comprising a primary winding 20 of the transformer 17 in parallel with a capacitor 21. A variable impedance triode tube 22 has its cathode connected to the screen grid 13 of the tube 10, and its anode connected to B+. In order that the voltage applied to the screen grid 13 of the tube 10 be reducible to zero, B— is connected to ground through a current limiting resistor 23 in series with a voltage regulator tube 24. B+ is, likewise, connected to ground through a current limiting resistor 25 in series with a voltage regulator tube 26, similar to the tube 24.

The high frequency voltage build up across the primary winding 20 in the oscillator circuit is stepped-up by a secondary winding 30 of the transformer 17 and rectified by a diode tube 31. One end of the winding 30 is connected to the anode of the tube 31, and the other end is connected to a negative output terminal 32. The cathode of the tube 31 is connected to a positive output terminal 33. A filter 34 of any suitable type may be connected across the output terminals 32, 33. A symmetrically arranged bleeder, for the purpose appearing hereinafter, is also connected across the output terminals 32, 33. Either one of the terminals 32 or 33 may be grounded selectively by a switch 34a. In one position of the switch 34a, as shown, only the negative output terminal 32 is grounded, as when a positive voltage output of the power supply is desired. In the second position of the switch 34a, only the positive output terminal 33 is grounded to provide a negative voltage output of the power supply.

The symmetrically arranged bleeder comprises a resistor 40 having one end connected to the positive output terminal 33 and the other end connected to one end of a resistor 41. The other end of the resistor 41 is connected to the negative output terminal 32 through a resistor 43 which has an ohmic value equal to that of the resistor 40. The resistor 41 may be the resistance representing a voltmeter 44; and the equal resistances 40, 43 may be voltmeter multipliers. A resistor 45 has one end connected to the junction between the resistors 40, 41; and a resistor 46, of similar ohmic value to the resistor 45, has one end connected to the junction between the resistors 41, 43. The other ends of the equal resistors 45, 46 are connected to one end of a resistor 47. The other end of the resistor 47 is connected to a switch contact 49 of a switch S1 through a resistor 50.

The operation of the radio-frequency power supply circuit, thus far described, in its unregulated state, is described in U. S. Patent No. 2,374,781, issued to O. H. Schade on May 1, 1945.

A regulating circuit is coupled to the radio-frequency power supply through the switches S1, S2, S3, S4 and S5 which may be ganged together on a single shaft represented by a dashed line 52 for simultaneous operation. The position of the switches S1, S2, S3, S4 and S5 indicated by the solid lines in the circuit diagram is for the regulated operation of the radio-frequency power supply to produce a positive voltage output; that is, with the negative output terminal 32 grounded. When a regulated negative voltage output is desired, the positive output terminal 33 is grounded and the switches S1, S2, S3, S4 and S5 are switched to the position represented by their dashed lines.

The regulating circuit comprises a triode tube 60 having a cathode grounded through a resistor 61, an anode connected to a switch contact 62 of the switch S5, and a grid connected to a point G between the resistor 47 and the resistor 50. A triode tube 64, which may be enclosed in the envelope of the tube 60 to form a duo-triode tube therewith, has a cathode which is also grounded through the resistor 61, an anode connected to a switch contact 65 of the switch S4, and a grid connected to a movable arm 66 of a potentiometer 67. The potentiometer 67 is connected between a switch contact 68 of the switch S2 and a switch contact 69 of the switch S3. The grid of the tube 64 is also connected to ground through a by-pass capacitor 70. Between a switch contact 71 of the switch S2 and a switch contact 72 of the switch S3 are two, equal, serially connected resistors 74, 75. The common junction of the resistors 74, 75 is grounded. A switch contact 76 of the switch S2 and a switch contact 77 of the switch S3 are connected to the junction between the resistor 25 and the tube 26 through equal resistors 78, 79, respectively. A switch contact 80 of the switch S1 is grounded, and a switch contact 81 of the same switch is connected to the junction between the resistor 25 and the tube 26. Switch contacts 82, 83 of the switches S4, S5, respectively, are connected to each other and to the grid of an amplifier triode tube 84 through a resistor 85. The switch contact 82 of the switch S4 is also connected to B+ through a resistor 86. Switch contacts 87, 88, of the switches S4, S5, respectively, are connected to B+. The anode of the tube 84 is connected directly to the grid of the tube 22, and to B+ through a load resistor 90. The cathode of the tube 84 is connected between the resistor 23 and the tube 24. The grid of the tube 84 is connected to ground through a filter comprising a capacitor 92 in series with a resistor 93, and to B— through a bias resistor 94.

A resistor 95 is connected across the switch contacts 49, 80 of the switch S1 in order to reduce the voltage and prevent sparking across the switch S1 during switching. The resistor 95 has an ohmic value much smaller than the resistor 47 but much greater than the resistor 25.

The operation of the regulating circuit will now be described. If a positive voltage output is desired, the negative output terminal 32 is grounded in any suitable manner, as by switch 34a in the position shown, and the switches S1, S2, S3, S4 and S5 are in the positions indicated in the circuit diagram by the solid lines. The movable arm 66 of the potentiometer 67 is adjusted for a given voltage output which will be indicated on the meter 44. Assume that, because of a change in the load (not shown), or for some other reason, the output voltage increases slightly. The voltage at the point G will, in turn, increase with respect to ground and the tube 60 will conduct more current. The tube 64 will, in turn conduct less current because of the increased voltage drop across the resistor 61. The voltage on the grid of the tube 84 will increase because of the rise in voltage at the anode of the tube 64, caused by a decrease in current through the load resistor 86. The tube 84 will now conduct more current and, because of the increased current through the load resistor 90, the voltage at the anode of the tube 84 will drop. Under these conditions, the impedance of the tube 22 is increased with the result that the voltage on the screen grid 13 of the oscillator tube 10 is decreased. The amplitude of the radio-frequency oscillations is thereby reduced and, consequently, the voltage output is reduced, thus moving toward the previously adjusted voltage output. A tendency for the voltage output to decrease would result in a reverse set of conditions, wherein the voltage output will tend to rise to the desired value.

In order that a negative voltage output shall correspond in magnitude to the positive voltage output and permit operation of the regulating circuit over the same range of voltages, the symmetrical bleeder and switching circuits provide for the fololwing conditions:

1. The sampling voltage at the point G which is fed to the grid of the tube 60 will always have the same fraction of the output voltage changes across it regardless of which output terminal is grounded.

2. The voltage at the point G will always have the same polarity to operate the tube 60 properly regardless of which output terminal is grounded.

3. The phase of the output provided by the regulating circuit will be shifted 180° whenever the polarity of the power supply is reversed.

4. A displacement of the arm 66 of the potentiometer 67 in a given direction will have the same effect upon the output voltage regardless of which output terminal is grounded.

The first condition is provided for by the use of the symmetrical bleeder comprising the resistors 40, 41, 43, 45, 46. As long as the resistors 45, 46 are much greater than the resistor 44 (the meter resistance), the meter current will be substantially independent of the effect of the resistors 45, 46. It is obvious to those skilled in the art that the meter 44 may be eliminated, if desired, and the resistors 45, 46 may be replaced by a single resistor without affecting the operation of the regulated power supply.

To maintain a fixed polarity of the voltage at the point G, and thereby satisfy the second condition, the switch S1 is between the switch contact 49, and the switch contact 80 for a positive voltage output, and between the switch contact 49 and the switch contact 81 for a negative voltage output. The switch S1, therefore, serves to maintain the voltage at the point G above the ground potential regardless of the voltage output polarity used.

In order that the same operating range of regulation obtain for both positive and negative polarity output voltages, $$(1) \qquad \frac{G2}{G1} = X$$

where G1 is the minimum desired value of the voltage at the point G, and G2 is its maximum desired value. X is the ratio of the maximum to minimum values of the voltage output at the terminals 32, 33, for a negative voltage output, as well as for positive voltage output. A symmetrical reversal will obtain if $$(2) \qquad G1 + G2 = V$$

where V, the voltage across the voltage regulator tube 26, is a relatively low voltage of the order of 50 to 300 volts. The Equations 1 and 2 serve to determine the values of G1 and G2 and the value of the resistor 50 relative to the resistors 45, 46 and 47. The same Equations 1 and 2 also determine the relative values of the resistors associated with switches S2 and S3.

To satisfy the third condition wherein an increase in the potential difference between the output terminals 32 and 33 will always lower the grid voltage of the variable impedance tube 22, the phase of the voltage changes amplified by the regulating circuit is shifted 180° by switching the anode load resistor 86 from the anode circuit of the tube 64 to the anode circuit of the tube 60, and vice versa, depending upon the voltage output polarity desired. This switching is accomplished by the switches S4, S5. The use of the cathode coupling between the tubes 60, 64 diminishes the influence of correlated cathode emission fluctuations in these tubes.

The switching circuit comprising the switches S2, S3 provides for the fourth condition whereby a displacement of the output voltage control arm 66 in a given direction will affect the output voltage in the same manner regardless of the voltage output polarity used. For example, if the negative output terminal 32 is grounded for a positive output voltage, a displacement of the arm 66 of the potentiometer 67 to the left, looking at the circuit diagram, will result in raising the output voltage. A similar displacement of the arm 66 when the positive output terminal is grounded, for a negative voltage output, and with the switches in their dashed position, will result in raising the output voltage also. This arrangement permits an operator to adjust the power supply by means of a single control in the same manner irrespective of the polarity chosen.

The operation of the regulated power supply, to produce a negative voltage output, is as follows: The positive output terminal 33 is grounded in any suitable manner and the switches S1, S2, S3, S4, S5 are switched to the position represented by their dashed lines. The arm 66 of the potentiometer 67 is adjusted to the desired voltage output. An increase in the output voltage will now lower the voltage at the point G, and at the grid of the tube 60, with respect to ground. This negative-going grid voltage will cause the tube 60 to conduct less current and the voltage at the plate of the tube 60 will increase because of the decreased current through the load resistor 86. From this point on, the operation of the regulating circuit, and its effect upon the amplitude of the radio-frequency oscillations of the tube 10, is the same as described previously for the positive voltage output.

There has been shown and described herein an improved, regulated, radio-frequency, high voltage, power supply capable of producing either a positive or a negative voltage output and having an equal range of operation and regulation in each of these voltage outputs. The reversibility of the voltage output is accomplished by employing a symmetrical bleeder and a novel and simple switching circuit for coupling the regulating circuit to the power supply circuit. The switches operate in a comparatively low D.-C. voltage circuit since no portion of the switching circuit ever exceeds a voltage with respect to ground greater than that of the B+ supply.

What is claimed is:

1. A power supply system comprising, in combination, a power circuit having two voltage output terminals, either one of which terminals may be grounded to produce a voltage output of selected polarity relative to ground, a regulating circuit to regulate said voltage output, switching means to selectively couple said regulating circuit to said power circuit in accordance with a selected voltage output polarity, means to feed back a sample of the output voltage to said regulating circuit to regulate said power supply, and said switching means comprising means to maintain said sample voltage at substantially the same fraction of said output voltage and at the same polarity with respect to ground regardless of which one of the output terminals is grounded.

2. A power supply system as defined in claim 1 in which said power circuit comprises means to produce radio-frequency oscillations, and said feedback means comprises a symmetrical bleeder means across said voltage output terminals for obtaining said sample of the output voltage, and said regulating circuit comprises means to vary the amplitude of said oscillations in response to said sample output voltage.

3. A power supply system as defined in claim 2 in which said symmetrical bleeder means comprises voltmeter multipliers, a voltmeter in series with said voltmeter multipliers, and a resistor across said voltmeter.

4. In a radio-frequency, high voltage power supply system of the class wherein a positive voltage output polarity is selected when a negative voltage output terminal is grounded, and a negative voltage output polarity is selected when a positive voltage output terminal is grounded, in combination, means for producing a unidirectional high voltage across said output terminals, means to regulate said unidirectional high voltage, switching means to selectively connect said regulating means to said high voltage producing means in accordance with a selected voltage output polarity, and means to apply to said regulating means a source of unidirectional voltage of relatively much lower voltage than said unidirectional high voltage.

5. A radio-frequency high voltage power supply as defined in claim 4 in which said switching means comprises a plurality of switches, a shaft, said switches being ganged together on said shaft for simultaneous operation therewith, and coupling connections from said regulating means and said high voltage producing means to said switches, said switching means and regulating means being insulated for a voltage much lower than said high voltage output.

6. A radio-frequency high voltage power supply system of the class wherein a positive voltage output polarity is selected when a negative output terminal is grounded, and a negative voltage output polarity is selected when a positive voltage output terminal is grounded comprising, in combination, means for producing a unidirectional high voltage across said output terminals, means to regulate said unidirectional high voltage, and switching means to selectively connect said regulating means to said high voltage producing means for said positive voltage output polarity and for said negative voltage output polarity.

7. A power supply system as defined in claim 6 comprising a symmetrically arranged bleeder connected between said positive output terminal and said negative output terminal, and means connected to the midpoint of said bleeder for obtaining a feedback sample voltage, 8. A power supply system as defined in claim 6 comprising means for obtaining a positive feedback sample voltage when said switching means is selectively connected for said positive voltage output polarity and for said negative voltage output polarity.

9. A power supply system as defined in claim 6, said regulating means comprising two electronic tubes each having at least a cathode, a grid, and an anode, a resistor connected in common with said cathodes, and a load resistor, said switching means comprising means to selectively connect said load resistor to one of said anodes when a positive voltage output polarity is selected and to the other of said anodes when a negative voltage output polarity is selected.

10. In a power supply system as defined in claim 6, means connected to said switching means comprising a potentiometer having an arm movable in one direction, for increasing the selected voltage output, and movable in an opposite direction for decreasing the selected voltage output.

References Cited in the file of this patent

UNITED STATES PATENTS

| Number | Name | Date |
|---|---|---|
| 2,386,548 | Fogel | Oct. 9, 1945 |
| 2,485,652 | Parker | Oct. 25, 1949 |